8024X
J. F. Axtell.
Thrashing Mach.
Patented Feb. 18, 1834.
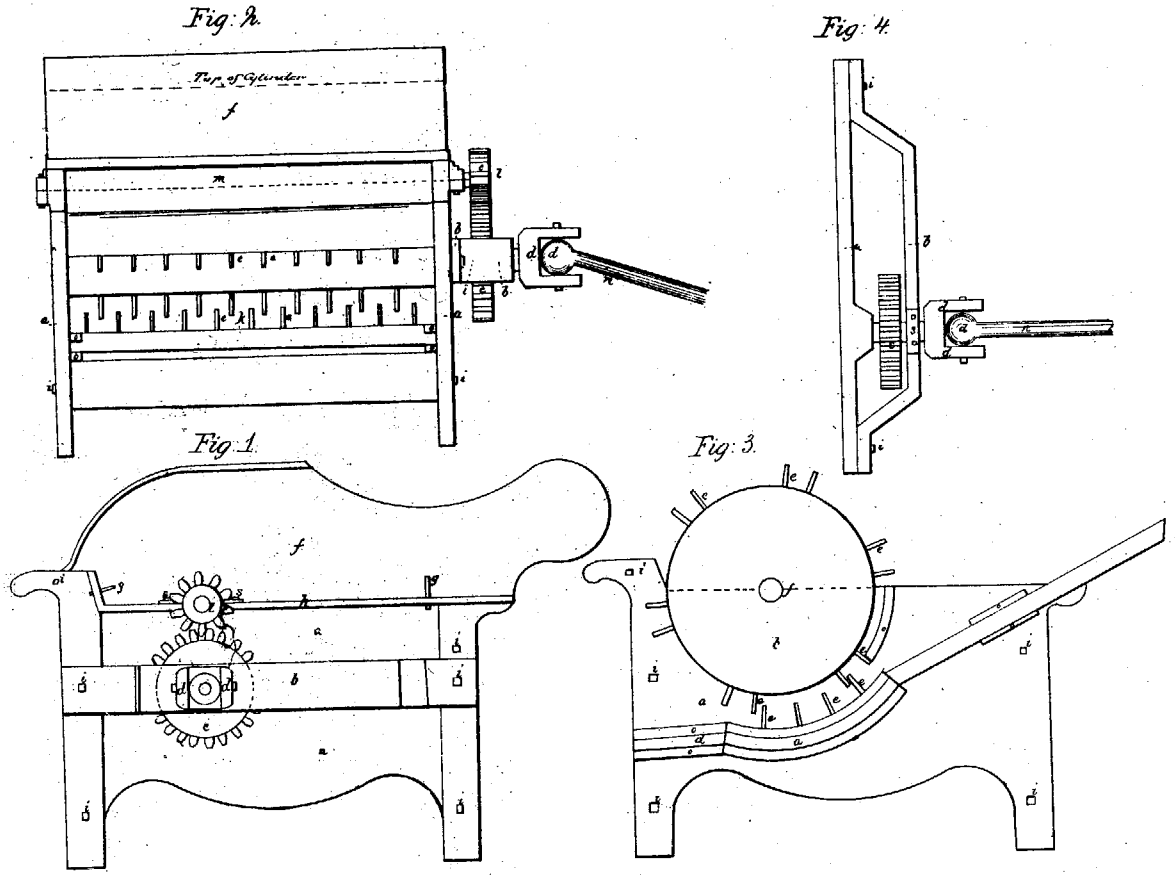

Jehiel F. Axtell Geneva N.Y.

80 24X

Letters Patent — February 18. 1834.

The Schedule referred to in these Letters Patent and making part of the same containing a description in the words of the said Jehiel F. Axtell himself of his improvement in the mode of making thrashing Machines To all persons to whom these Presents shall come, Jehiel F. Axtell of the Village of Geneva in the County of Ontario and State of New York [illegible] Mechanic sends greeting:......

Be it known that I the said Jehiel F. Axtell have invented constructed made and applied to use, a new and useful improvement in the manner & mode of making thrashing Machines, the sides of the same to be made of Cast or wrought iron :— The advantage of having the same made of iron, is its being stronger more durable less liable to get out of repair, more steady and regular in its operations & although of greater strength is of less size and more compact, takes up less room and is more easily transported from place to place if required: by having the sides in one piece of Metal with the grooves and flanges forming a part makes the whole firm and impossible for it to get out of place.

The small compass of the Machine the durability of its materials the facility with which it can be moved and put in operation & the low price for which it can be obtained gives the said Thrashing Machine which is called "Axtells Cast iron Thrashing Machine" a decided advantage over any other thrashing Machine now in use The Model of said Machine in the Patent Office of the United States at Washington as well as the plates hereto attached No 1, 2, 3, 4, & the lettering of the same with the Specification thereof given below will particularly set forth and describe the different parts of the machine the distinct operation and use of each part & the effect produced when put in operation The improvement claimed is in making the sides of the machine of iron instead of wood & other material & for the manner in which the same is put together Plate No 1 Is an upright side view of the machine lettered and described as follows

8024X

Letter a a upright side plate of the Machine made of cast iron the end of the
plate being raised & forming the legs of the machine as represented by letters p. p.
the top of the plate forming a flange as represented by letter h which supports
the cap of the machine letter f. b a brace or rest attached to the main plate
by bolts or screws supporting the out end of the journal of the main wheel and
between which the main plate the main wheel moves the journal of the main
wheel being confined on the rest by a coupling as represented by letter s in plate
No 4 the brace or rest is more plainly represented in plate No 4 by letter b
c the main wheel of machine meshing into pinion wheel l. d d a univer-
sal joint attached to journal of main wheel connecting the machine with
the power by which it is propelled f the side of the cap of machine made
of wood which can be taken off at pleasure g g pins attached to the cap
passing thro the flange h and confining cap to main plate h the top part of
main side plate forming a flange projecting to the front thro which pins
g g pass.

i i i i i i bolts or screws confining the machine together s s coupling
confining the journal of pinion wheel to said plate Plate No 2 an end view
of the machine Letters a a edges of the side plates forming the legs which
support the machine b the brace or rest c c the main wheel d d the
universal joint connecting the machine with the power applied to letter m
a line shaft e e e e the teeth or spikes in the cylinder and concave of machine
as will more clearly appear in plate No 3. f the cap of the machine covered
with sheet iron i i the bolts or screws connecting side plates with timbers j k m
j lower part of frame between side plates k the apron board joined to the con-
cave let into side plates by means of grooves in the side plate as repre-
sented by letters o o in plate No 2 & 3. l pinion wheel meshing into main wheel
and driving the cylinder k in plate No 3. m the top of frame between
side plates n line shaft Plate No 3 an upright inside view of side plates
Letters a a the side plate b an end view of cylinder d d d. c t grooves in which
the apron concave and slide are placed. e e e e e e the teeth or spikes fixed in
concave and on cylinder which thrash the grain f the journal of the cylinder
i i bolts or screw holes o o o o flanges cast on plate forming grooves as represented
in plate No 2 by letters o o o o. Plate No 4 a t horizontal view of the side plate rest, main wheel, universal joint line shaft &c. [illegible] a top of plate to the brace or rest supporting journal of main wheel. cc the main wheel d, d, d universal joint i i bolts or screws connecting brace or rest with side plate of machine - n line shaft S coupling confining journal of main wheel to the brace or rest. In testimony that the above is a true specification of my said improvement as above described called "C Aytell Cast Iron Thrash=ing Machine". I have hereto set my hand this 23rd day of June AD 1833

Witnesses
Saml Mott
C Rodney

Schuie L Aytell

Drawing

Exd. WGC 1104 words